United States Patent [19]

Speca et al.

[11] Patent Number: 4,650,842
[45] Date of Patent: Mar. 17, 1987

[54] OLEFIN POLYMERIZATION PROCESS EMPLOYING CATALYST PREPARED FROM HIGH PORE VOLUME, HIGH PURITY ALUMINA GEL

[75] Inventors: Anthony N. Speca, Kingwood, Tex.; Roger D. Laib, Cincinnati, Ohio

[73] Assignee: National Distillers and Chemical Corporation, New York, N.Y.

[21] Appl. No.: 723,110

[22] Filed: Apr. 15, 1985

Related U.S. Application Data

[62] Division of Ser. No. 531,096, Sep. 12, 1983, Pat. No. 4,536,489.

[51] Int. Cl.$^4$ ............................ C08F 4/02; C08F 4/52; C08F 4/62
[52] U.S. Cl. ..................................... 526/100; 526/105; 526/106; 526/134; 526/154; 526/156; 526/352; 526/905; 526/908
[58] Field of Search ............... 526/100, 105, 106, 134, 526/154, 156, 908, 352, 905

[56] References Cited

U.S. PATENT DOCUMENTS

| | | | |
|---|---|---|---|
| 3,738,944 | 6/1973 | Candlin et al. | 526/156 X |
| 4,148,755 | 4/1979 | Ligorati et al. | 526/156 X |
| 4,212,765 | 7/1980 | Gutweiler | 526/156 X |
| 4,234,709 | 11/1980 | Reckers et al. | 526/156 X |
| 4,247,669 | 1/1981 | Reginato et al. | 526/156 |
| 4,290,914 | 9/1981 | Katzen et al. | 526/156 X |
| 4,297,461 | 10/1981 | Speca | 526/156 X |
| 4,478,987 | 10/1984 | Fanelli et al. | 526/156 X |

*Primary Examiner*—Joseph L. Schofer
*Assistant Examiner*—F. M. Teskin
*Attorney, Agent, or Firm*—Kenneth D. Tremain

[57] ABSTRACT

Novel high pore volume, high purity alumina gels and catalysts prepared therefrom are provided by a unique alumina gel preparation comprising hydrolyzing an aluminum alcoholate in a medium of a mixture of water and acetone, aging the resultant product and thereafter washing with acetone. Processes for the polymerization of olefins utilizing the afore-described alumina gels are also included herein.

10 Claims, No Drawings

OLEFIN POLYMERIZATION PROCESS EMPLOYING CATALYST PREPARED FROM HIGH PORE VOLUME, HIGH PURITY ALUMINA GEL

This is a divisional of copending application Ser. No. 531,096, filed on Sept. 12, 1983, U.S. Pat. No. 4,536,489.

BACKGROUND OF THE INVENTION

This invention relates to alumina gels and more particularly to a process for the preparation of alumina gels of controlled porosity.

Aluminas are known and widely used as absorbents, catalysts, catalyst carriers and the like.

It is well known to produce alumina by the hydrolysis of an aluminum alkoxide. Such procedures are disclosed, for example, in U.S. Pat. Nos. 2,796,326, 2,805,920, 2,899,268, 2,917,365, 2,917,366, 3,019,080, 3,264,063, 3,419,352 and 4,172,809.

In uses of the type described hereinbefore, e.g. catalysts and catalyst carriers, the physical properties of the alumina, such as surface area, purity, pore volume and pore distribution, are of considerable importance.

Thus, U.S. Pat. No. 2,917,366 discloses the production of a high surface area alumina by forming a polymeric aluminum alkoxide of a polyhydric alcohol, then subjecting the polyalkoxide to hydrolysis with water, thereby forming polymeric, hydrated aluminum oxide in the form of very small micelles, which gives upon drying and calcining an alumina gel having an extended surface area.

U.S. Pat. No. 2,805,920 discloses another method for the production of high surface area alumina. According to this patent, a high surface area alumina of good thermal stability is provided by a process involving hydrolyzing an aluminum alcoholate by means of limited amounts of water dissolved in an organic liquid, such as an alcohol, typically isopropyl alcohol. Moreover, the data in this patent indicates that the resultant alumina has pore volumes, as high as 1.4 cc/g.

According to U.S. Pat. No. 2,917,365 aluminas of high purity are obtained by hydrolyzing aluminum alcoholate with water containing a relatively small amount of beta alumina trihydrate dispersed therein.

More recently, U.S. Pat. No. 4,172,809 discloses a process for controlling the porosity of aluminas during preparation. Thus, in one aspect of the disclosed invention therein, an alumina gel is obtained by the process of the hydrolysis of an aluminum alcoholate, such as an aluminum butylate in a water or alcohol solution. The gel is then filtered and if desired, washed with a solvent capable of removing the water from the gel. The patentee states that the solvent may be an alcohol or a ketone and in general a solvent capable of forming an azeotrope with water. The alumina must then be extruded in the presence of an alcohol.

As indicated by the prior art, there is a considerable amount of interest in being able to control and influence the physical properties of alumina gels.

SUMMARY OF THE INVENTION

Accordingly, it is one object of the present invention to provide a process for the preparation of alumina gel of controlled physical properties.

Another object of this invention is to provide a process for the preparation of alumina gel of controlled porosity.

Still another object of the present invention is to provide a process for the preparation of high purity alumina gel.

A further object of this invention is to provide high purity, high pore volume alumina which is suitable as a catalyst and/or catalyst carrier.

A still further object of the present invention is to provide high pore volume alumina gel which is particularly well suited for catalysts in the preparation of high melt index polymers.

Another object of the invention is to provide novel catalysts particularly well suited for the preparation of low molecular weight polymers useful in the production of films.

These and other objects are accomplished herein by a process which comprises hydrolyzing an aluminum alcoholate in a hydrolyzing medium comprised of a mixture of water and acetone, aging the resulting hydrolysis product, washing the resultant gel with acetone and thereafter drying the gel, wherein said water in said hydrolysis medium is present in an amount sufficient to provide a $H_2O/Al$ ratio of from about 15:1 to about 26:1, and said aging period is from about 4 hours to about 24 hours. Further objects of the invention are achieved by preparing catalysts employing the novel alumina of this invention as a support.

DETAILED DESCRIPTION OF THE INVENTION

Accordingly, it has been surprisingly discovered herein the alumina gels with a variety of pore volumes can be produced by varying the hydrolysis conditions by which the gels are produced.

More particularly, it has been found that the porosity of alumina gels can be varied by controlling, in combination, the content of the hydrolysis medium, the $H_2O/Al$ mole ratio during hydrolysis, the washing conditions, and the aging time, i.e. the time that the hydrous alumina is maintained in the slurry before drying. By controlling all these facets, in combination, an alumina gel is formed having a desirable pore volume and which can be admixed with other catalyst components, to be discussed hereinafter, to yield catalysts which are particularly well suited as polymerization catalysts especially for the production of high melt index polymers.

Thus, in accordance with the present invention, an aluminum alcoholate or alkoxide is added to a hydrolysis medium comprised of a mixture of water and acetone. Any commercially available aluminum alkoxide can be hydrolyzed in accordance herewith. Generally, these aluminum alkoxides are prepared by first reacting metallic aluminum with an alcohol, preferably anhydrous, to form an aluminum alcoholate. Alcohols that are employed for this purpose include ethyl alcohol, propyl alcohol, isopropyl alcohol, n-butyl alcohol, sec-butyl alcohol, isobutyl alcohol, pentanol-1, pentanol-2, 3-methyl butanol-1, 2-methyl butanol-3, pentanol-3, hexanol-1, hexanol-2, hexanol-3, the various heptyl alcohols, the various octyl alcohols etc., including those higher alcohols which are liquid at operational temperatures. Moreover, mixtures of alcohols are also used.

Thus, typical aluminum alcoholates or alkoxides which are suitable for hydrolysis according to the present invention include aluminum ethoxide, aluminum-isopropoxide, aluminum n-butoxide, aluminum sec-butoxide, etc. For the purposes of this invention aluminum sec-butoxide is preferred.

Accordingly, in carrying out the preparation of the alumina gels of the present invention, the aluminum alcoholate is introduced to a mixture of water and acetone. Generally, the water to acetone ratio is from about 20% to 40% water to acetone and the amount of water in the hydrolysis medium is present in amount sufficient to provide a $H_2O/Al$ mole ratio of from about 15:1 to about 26:1. Using aluminum sec-butoxide (ASB) as exemplary the preparation of the improved alumina gel of the present invention is as follows:

2.5 kg of ASB is combined with 500 g hexane in a one-gallon vessel. A two-hole rubber stopper equipped with a glass dip tube and Drierite dessicant tube is added. A piece of latex tubing connects this assembly to a metering pump. 2744 g water and 4116 g acetone are added to a vessel and the ASB solution is metered in at a rate of 30 g/min. For the first run stirring was set at 37 rpm and the resulting hydrogel was aged for four hours at room temperature and 37 rpm. The aged hydrogel was divided into two portions. One portion was dried at elevated temperature (70° C.) in vacuo after filtering; the second portion was acetone washed to a decant specific gravity of $\leq 0.8$ indicating the majority of water was removed. The slurry was then dried in vacuo as above. The runs are detailed in Table 1. The effect of experimental conditions on pore volume are clearly evident. In addition, acetone washing is essential for preservation of pore volume during the drying step.

TABLE 1

| | Large Batch Al(OBu$^s$)$_3$ Hydrolyses | | | | |
|---|---|---|---|---|---|
| Example | rpm During Addition | rpm During Aging | Aging Time (hr) | Acetone Washed | Water P.V. (cc/g) |
| 1 | 37 | 37 | 4 | No | 0.7 |
| 2 | 37 | 37 | 4 | Yes | 2.0 |
| 3 | 37 | 37 | 20 | No | 0.9 |
| 4 | 37 | 37 | 20 | Yes | 2.2 |
| 5 | 37 | 37 | 20* | Yes | 1.8 |
| 6 | 81 | 37 | 4 | No | 0.8 |
| 7 | 81 | 37 | 4** | Yes | 1.3 |
| 8 | 81 | 37 | 4 | Yes | 2.1 |

*24 hour additional static aging
**40 hour additional static aging

All batches were sieved after drying. Table 2 shows that particle size distribution is also a function of experimental conditions. Data for batches 2, 4, 8 and Ketjen Grade B "high pore volume" alumina were analyzed using the Rosen-Rammler equation. The results are shown in Table 3. All the aluminas of the present invention are quite different from the Ketjen material and exhibit narrower particle size distributions (higher value of n) and higher average particle size. These four gels were submitted for analysis. Pertinent data are presented in Table 4. Examination of the data clearly demonstrates the unique properties of the aluminas of the present invention, i.e., high nitrogen pore volume, high surface area and large average pore diameter when compared to Ketjen Grade B alumina. Furthermore, the occurrence of both high $N_2$ and water pore volumes indicates that pores in the alumina of the present invention are inter-particle while the low $N_2$ and high water pore volume of the only commercially available "high PV" Ketjen alumina shows that the large pores of this material arise from the agglomeration of smaller particles (i.e. large pores are really spaces between agglomerated particles) and are intraparticle.

The aluminas prepared in accordance with this invention, due to their unique properties, serve as exceptional catalyst supports. As an example, in the area of olefin polymerization, these high pore volume alumina are coated with $CrO_3$ .TEP (triethylphosphate) after pre-calcining to 1200° F. for six hours in a fluidized bed using dry air. Portions of the coated gel were activated in a similar fashion to various temperatures. The resulting catalysts were evaluated in the bench scale reactors and compared with a similar catalysts prepared using Ketjen Grade B alumina as a support. The data appear in Table 5. It is evident that changes in support properties are reflected in the resulting polymer properties. The alumina of this invention provides higher melt index resin indicative of lower weight average molecular weight material. The increase in melt index parallels the increase in nitrogen pore volume and further substantiates the uniqueness of the aluminas of the present invention.

TABLE 2

| | Sieve Analysis of Alumina Gels | | | | | | | | |
|---|---|---|---|---|---|---|---|---|---|
| | Percent Accumulated on Given Mesh | | | | | | | | |
| Example | 80 | 100 | 120 | 140 | 170 | 200 | 270 | 325 | >325 |
| 1 | 1.0 | 1.0 | 3.0 | 7.0 | 16 | 18 | 24 | 16.5 | 13.5 |
| 2 | 28 | 16 | 11.5 | 15 | 18 | 10 | 0.5 | 1.0 | — |
| 3 | 70 | 5.5 | 9 | 9 | 3.2 | 1.3 | 0.2 | 0.25 | — |
| 4 | 36.4 | 28.8 | 20 | 8.7 | 4.8 | 0.7 | 0.45 | 0.11 | — |
| 5 | 12.5 | 17.7 | 21.3 | 22 | 17.8 | 6.7 | 1.3 | 0.99 | — |
| 6 | 99 | 0.6 | 0.2 | trace | trace | trace | trace | trace | — |
| 7 | 14.8 | 4.2 | 9.3 | 21.1 | 35.1 | 14 | 1.6 | 0.2 | — |
| 8 | 41 | 30.3 | 19 | 8.2 | 1.1 | 0.3 | 0.1 | — | — |
| Ketjen Alumina Grade B | 5 | 15 | 15.5 | 14 | 15.5 | 14.5 | 12 | 6.5 | 1.5 |

TABLE 3

| | Rosin-Rommler Equation Data | | |
|---|---|---|---|
| Example | Uniformity Factor (n) | Avg. Particle Size d$_{63}$ | Median Particle Size d$_{50}$ |
| 2 | 4.47 | 153 | 141 |
| 4 | 5.87 | 174 | 164 |
| 8 | 8.04 | 174 | 166 |
| Ketjen Alumina Grade B | 3.45 | 122 | 110 |

TABLE 4

| LARGE BATCH ALUMINA GELS VS. COMMERCIAL ALUMINA* | | | | | | |
|---|---|---|---|---|---|---|
| | RPM | | Aging | Pore Vol. (cc/g) | | Surface | Avg. Pore |
| Example | Add'n | Aging | Time (Hr) | $H_2O$ | $N_2$ | Area (m$^2$/g) | Diam (Å) |
| 2 | 37 | 37 | 4 | 2.0 | 1.82 | 496 | 175 |

TABLE 4-continued

LARGE BATCH ALUMINA GELS VS. COMMERCIAL ALUMINA*

| Example | RPM Add'n | RPM Aging | Aging Time (Hr) | Pore Vol. (cc/g) $H_2O$ | Pore Vol. (cc/g) $N_2$ | Surface Area (m²/g) | Avg. Pore Diam (Å) |
|---|---|---|---|---|---|---|---|
| 4 | 37 | 37 | 20 | 2.2 | 1.62 | 431 | 185 |
| 8 | 81 | 37 | 4 | 2.1 | 1.63 | 428 | 185 |
| Ketjen Grade B Alumina | | | | 1.8 | 0.78 | 400 | 85 |

*$H_2O/Al$ (Molar) 15/1
$H_2O$ in Acetone 40 Wt. %

TABLE 5

EVALUATION OF $CrO_3$/TEP ON ALUMINA SUPPORTS

| Support* | Activation Temp. (°F.) | Conditions Temp. B/Cr, $H_2$ | Prod (G-PE/G CAT-Hr) | MI | HLMI | MIR |
|---|---|---|---|---|---|---|
| KETJEN B | 1400 | 210, 3/1, 30 | 207 | LOW | 1.1 | — |
| Alumina prepared in accordance with the present invention | 1400 | 210, 3/1, 30 | 293 | LOW | 5.5 | — |
| | 1400 | 210, 3/1, 0 | 311 | LOW | 0.4 | — |
| | 1400 | 215, 3/1, 30 | 234 | 0.05 | 9.5 | 190 |
| | 1500 | 215, 3/1, 30 | 201 | 0.13 | 26.4 | 203 |
| | 1700 | 215, 3/1, 30 | 151 | 0.30 | 51.3 | 171 |

*All Supports Precalcined To 1200° F. Prior To Coating And Activation

The following further examples are offered by way of illustration to assist one of ordinary skill in the art to practice the present invention.

EXAMPLES

General Procedure

The hydrolysis involves the addition of aluminum sec-butoxide, $Al(OBu^s)_3$, to a rapidly stirred mixture of water and acetone. The alkoxide is diluted with hexane to reduce the viscosity and thus facilitate addition. After total addition, the mixture is stirred for 0.5–1.0 hour. Stirring is stopped and the hydrogel is aged at ambient temperature. The aqueous-organic liquid is replaced with fresh acetone followed by slow stirring for 0.5 hour. The solid is permitted to settle and the procedure is repeated two more times. Alternately, the aqueous-organic liquid is removed by vacuum filtration and the solid is washed with three aliquots of acetone. The resulting cake is dispersed in fresh acetone and permitted to settle overnight. In either case, the final acetone layer is decanted and the slurry is dried in vacuo to 75° C.

EXAMPLE 9

To a mixture of 274 g $H_2O$ and 1095 g acetone (25 wt. % $H_2O$ in acetone) was added 186 g of alkoxide solution (25.5/1, $H_2O/Al$) under rapid stirring at 5° C. The slurry was aged for 24 hours prior to work-up. The data is shown in Table 6.

EXAMPLE 10

190 g alkoxide solution (15/1, $H_2O/Al$) was added under rapid stirring to 165 g $H_2O$ and 495 g acetone (25 wt. % $H_2O$ in acetone) at 5° C. Work-up followed a 24 hour aging period. Data from these runs are listed in Table 6. Pore volumes were obtained on samples heated to 1000° F. for four hours.

TABLE 6

Experiments For Aluminum sec-Butoxide Hydrolysis

| Example | $H_2O/Al$ (moles) | Moles Al (Hydrolyzed) | Wt. % $H_2O$ in Acetone | Hydrolysis Temp. °C. | Aging (hr) | Pore Volume* (cc/g) |
|---|---|---|---|---|---|---|
| 9 | 25.5 | 0.60 | 25 | 5 | 24 | 1.8 |
| 10 | 15 | 0.60 | 25 | 5 | 24 | + |

*$H_2O$ titration
+ granular solid

In a second series of experiments, the effects of $H_2O/Al$ molar ratio, % $H_2O$ in acetone, hydrolysis temperature and aging time on the pore volume and yield were investigated. The values for these variables are listed in Table 7. The rate of alkoxide solution addition was constant at 0.5 g Al/min. To maintain the stirring speed at a constant rate, a fixed volume of water and acetone was chosen for the study. The percent theoretical yield of alumina (based on weight loss upon heating to 1000° F./4 hr) and pore volume are shown in Table 7.

TABLE 7

Systematic Study of Aluminum sec-Butoxide Hydrolysis

| Example | $H_2O/Al$ (moles) | Moles Al Hydrolyzed | Wt. % $H_2O$ in acetone | Hydrolysis Temp. (°C.) | Aging Time (hr) | % Yield* $Al_2O_3$ | Pore Volume+ (cc/g) |
|---|---|---|---|---|---|---|---|
| 11 | 25 | 0.84 | 20 | 5 | 4 | 94 | 1.4 |
| 12 | 25 | 0.51 | 20 | 5 | 24 | 93 | 2.5 |
| 13 | 15 | 1.77 | 40 | 5 | 24 | 84 | 2.3 |
| 14 | 25 | 1.06 | 40 | 5 | 4 | 83 | 1.4 |
| 15 | 15 | 0.84 | 20 | 25 | 24 | 99 | 2.0 |
| 16 | 25 | 0.51 | 20 | 25 | 4 | 91 | 1.6 |
| 17 | 15 | 1.77 | 40 | 25 | 4 | 96 | 2.2 |

TABLE 7-continued

| | Systematic Study of Aluminum sec-Butoxide Hydrolysis | | | | | | |
|---|---|---|---|---|---|---|---|
| Example | H₂O/Al (moles) | Moles Al Hydrolyzed | Wt. % H₂O in acetone | Hydrolysis Temp. (°C.) | Aging Time (hr) | % Yield* Al₂O₃ | Pore Volume+ (cc/g) |
| 18 | 25 | 1.06 | 40 | 25 | 24 | 94 | 2.0 |

*Calculated using moles of Al hydrolyzed and moles of Al in product after calcination to 1000° F. for four hours
+H₂O titration Results The data clearly demonstrate that aluminas with a variety of pore volumes can be produced by varying the experimental conditions chosen for the hydrolysis reaction. Table 7 lists a range of pore volumes from 1.4 (Examples 11 and 14) to 2.5 (Example 12). The factors having the greatest effect are aging time and water to aluminum molar ratio.

Another series of polymerizations of 10 moles % ethylene were carried out using isobutane as the diluent. Hydrogen and triethylborane (about 2/1 B/Cr atomic ratio) were added to the reactor. The results are set forth in Table 8. Comparison of the polymer properties demonstrates that the higher pore volume alumina of the present invention produces lower MW polymer than the Ketjen alumina under identical conditions. Furthermore, the melt index of the resin can be varied through changes in hydrogen, reactor temperature or activation temperature. The higher MI values for the 1700° F. activation and the known dependence of MI on pore volume show that no loss of pore volume has occurred.

The commercially available alumina gel was Ketjen Grade B alumina gel from Armak Chemicals. The high pore volume alumina gel of the present invention was prepared in accordance with the disclosure herein. The alumina is calcined to 1200° F. for six hours in dry air prior to coating. The calcined gel is charged into a 500 ml, three neck flask equipped with a mechanical stirrer and nitrogen inlet. Enough dichloromethane is added to the flask and stirring is begun to produce a slurry. A solution of the adduct formed between chromium (VI) oxide and triethylphosphate is added using an addition funnel in sufficient quantity to provide a dry coated catalyst containing 0.9% by weight of Cr. The dichloromethane is removed by drying the coated gel on a rotary evaporator at temperatures up to about 40° C. and 20–40 mm Hg vacuum. The supported catalyst is fluidized with dry air at about 3.6 meters per hour linear velocity while being heated to the activation temperature and held at this temperature for six hours. The activated catalyst is recovered as a free flowing powder.

TABLE 8

| | | | | | Evaluation of CrO₃/TEP on Alumina Supports | | |
|---|---|---|---|---|---|---|---|
| Support | Activation Temp. (°F.) | Reactor Temp. (°F.) | H₂ (psi) | Productivity (g PE/g cat-hr) | \multicolumn{3}{c}{Resin Properties} |
| | | | | | MI | HLMI | MIR |
| Ketjen | 1400 | 210 | 30 | 420 | Low | 1.05 | — |
| Alumina of the present invention | 1400 | 210 | 30 | 304 | Low | 4.56 | — |
| | | | | 301 | Low | 4.50 | — |
| | | | | 275 | 0.05 | 8.0 | 160 |
| ↓ | 1400 | 210 | 0 | 427 | Low | 0.25 | — |
| ↓ | | | | 320 | Low | 0.41 | — |
| ↓ | | | | 359 | Low | 0.34 | — |
| ↓ | 1400 | 215 | 30 | 208 | 0.08 | 11.16 | 145 |
| ↓ | | | | 202 | 0.04 | 8.3 | 208 |
| ↓ | | | | 293 | 0.05 | 8.9 | 178 |
| ↓ | 1500 | 215 | 30 | 257 | 0.08 | 18.9 | 236 |
| ↓ | | | | 183 | 0.09 | 17.0 | 189 |
| ↓ | | | | 251 | 0.14 | 23.3 | 166 |
| ↓ | 1700 | 215 | 30 | 238 | 0.34 | 60 | 176 |
| ↓ | | | | 182 | 0.25 | 36.7 | 147 |
| ↓ | | | | 157 | 0.35 | 47.9 | 137 |

The chromium-containing compounds useful in the preparation of catalysts herein can comprise any chromium containing compound capable of reacting with the surface hydroxyl groups of the inorganic support. Examples of such compounds include chromium trioxide, chromate esters such as those disclosed in U.S. Pat. No. 3,642,749; and 3,704,287, and organophosphoryl chromium compounds such as those disclosed, for example, in U.S. Pat. No. 4,049,896 (all incorporated herein by reference) which comprise the reaction product of chromium trioxide with an organophosphorus compound having the formula:

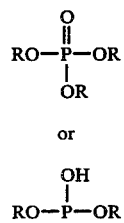

or $$\begin{array}{c} \text{OH} \\ | \\ \text{RO}-\text{P}-\text{OR} \end{array}$$

wherein R is alkyl, aralkyl, aryl, cycloalkyl or hydrogen, but at least one R is other than hydrogen. The preferred organophosphorus compounds are trialkyl phosphates such as triethyl phosphate.

Moreover, the novel catalysts of the present invention may be prepared by depositing the chromium containing compound on the inorganic support in any suitable manner such as by vapor coating or by impregnating the support with solutions of the chromium containing compound in a suitable inert solvent which is normally an anhydrous organic solvent. Such organic solvents include aliphatic, cycloalkyl and alkylaryl hydrocarbons and their halogenated derivatives. A preferred organic solvent is dichloromethane.

The most effective catalysts have been found to be those containing the chromium compound in an amount such that the amount of Cr by weight based on the weight of the support is from about 0.25 to 2.5% and preferably is from about 0.5 to 1.25%, although amounts outside of these ranges still yield operable catalysts.

After the chromium containing compound has been deposited on the inorganic support, the support is heated in a non-reducing atmosphere, preferably in an oxygen containing atmosphere, at a temperature above about 300° C. up to the decomposition temperature of the support. Typically, the supported compositions are heated at a temperature of from 500° to 1000° C. The heating time may vary, for example, depending on the temperature used, from ½ hour or less to 50 hours or more. Normally the heating is carried out over a period of 2 to 12 hours. The non-reducing atmosphere which is preferably air or other oxygen containing gas should be dry and preferably should be dehumidified down to a few parts per million (ppm) of water to obtain maximum catalyst activity. Typically, air used in the procedure described in this application is dried to less than 2-3 ppm of water.

The heat-treated supported chromium compounds of the present invention may be used in combination with metallic and/or non-metallic reducing agents. Examples of metallic reducing agents include trialkyl aluminums, such as triethyl aluminum, triisobutyl aluminum, alkyl aluminum halides, alkyl aluminum alkoxides, dialkyl zinc, dialkyl magnesium, and metal borohydrides including those of the alkali metals, especailly sodium, lithium and potassium, and of magnesium, beryllium and aluminum. The non-metal reducing agents include boron alkyls such as triethyl borane, triisobutyl borane, and trimethyl borane and hydrides of boron such as diborane, pentaborane, hexaborane and decaborane.

The heat-treated, supported chromium containing compound may be combined with the metallic or non-metallic reducing agent prior to being fed to an olefin polymerization reactor or these two components may be fed separately to an olefin polymerization reactor.

In proportioning the amount of metallic or nonmetallic reducing agent to the amount of chromium compound used in the catalyst systems of the present invention, fairly wide latitude is available, but some guidlines have been established consistent with good yield, favorable polymer properties and economic use of materials. For example, in the use of metallic and/or non-metallic reducing agents with an amount of chromium compound sufficient to yield about 1% Cr by weight of the support the parameters set forth below are representative. The atomic ratios are based upon a calculation of the metal in the metallic reducing agent and/or the non-metal in the nonmetallic reducing agent versus the chromium content present in the chromium compound on the support.

For example, based upon a catalyst composition containing about 1% by weight of Cr based upon the weight of the support, the preferred amount of an organometallic reducing agent for use therewith, e.g., triisobutyl aluminum (TIBAL), is about 11.4% by weight and equivalent to an Al/Cr atomic ratio of about 3/1. The preferred range of atomic ratios of Al to Cr is from about 0.5/1 to about 8/1, or from about 1.9% to about 30% by weight TIBAL. The overall practicable limits of TIBAL in terms of the Al/Cr atomic ratio are from about 0.1/1 to 20/1, and in terms of weight are from about 0.4% to about 75% by weight.

Another example of an organometallic reducing agent for use in conjunction with the catalyst composition of the present invention is triethylaluminum. Again based upon a catalyst composition containing about 1% by weight of Cr based upon the weight of the support, the preferred amount of triethyl aluminum (TEA) is about 6.6% by weight based upon the weight of the support giving an Al/Cr atomic ratio of about 3/1. The preferred range of atomic ratios of Al to Cr is from about 0.5/1 to about 8/1, or from about 1.1% to about 18% by weight of TEA. The overall practicable limits of TEA, in terms of an Al/Cr ratio, are from about 0.1/1 to 20/1, and in terms of weight are from about 0.22% to about 44% by weight.

Triethyl boron (TEB) may be taken as the preferred example of the proportions of non-metallic reducing agent for use in conjunction with the catalyst composition of the present invention. Again based upon a catalyst composition containing about 1% by weight of Cr based upon the weight of the support, the preferred amount of TEB is about 5% by weight based upon the weight of the support giveing a B/Cr atomic ratio of about 2.7/1. The preferred range of atomic ratios of B to Cr is from about 0.1/1 to 10/1, or from about 0.19 to about 19% TEB. The overall practicable limits, in terms of a B/Cr ratio, are from about 0.01/1 to about 20/1, and in terms of weight, are from about 0.02% to about 38% by weight based upon the weight of the support.

As indicated above, the catalyst compositions of this invention are amenable to use with conventional polymerization processes for olefins, in particular 1-olefins having 2–8 carbon atoms, preferably ethylene, and are suitable for polymerization effected under temperature and pressure conditions generally employed in the art, e.g., temperatures of from about 40° C. to about 200° C. and preferably from about 7° C. to about 110° C., and pressures of from 200 to 1000 psig and preferably from 300 to 800 psig, as are used in slurry or particle form polymerizations.

Obviously, other modifications and variations of the present inventionare possible in light of the above teachings. It is therefore to be understood that changes may be made in the particular embodiments of this invention which are within the full intended scope of the invention as defined by the appended claims.

We claim:

1. A process for the polymerization of olefins, said process comprising contacting an olefin with a heat activated catalyst system comprising
   (a) an alumina gel support material and a chromium containing compound deposited on said alumina gel support,
   said alumina gel support having an interparticle nitrogen pore volume of 1.4 to 1.8 cc/g, a surface area of 428 to 496 m²/g and surface hydroxyl groups thereon and said chromium containing compound being adapted to react with said hydroxyl groups, and
   (b) reducing agent amounts of metallic or non-metallic reducing agent
   said alumina gel support material being prepared by a process comprising the steps:
   (i) hydrolyzing an aluminum alcoholate in a hydrolyzing medium comprised of a mixture of water and acetone having an $H_2O/Al$ ratio of from about 15:1 to about 26:1;

(ii) aging the product of step (i) for about 4 hours to about 24 hours;
(iii) washing the resultant aged product from step (ii) with acetone until the majority of said water is removed therefrom; and
(iv) further drying the product from step (iii).

2. The process of claim 1 wherein said olefin is ethylene.

3. The process of claim 1 wherein said alumina gel is prepared by the hydrolysis of aluminum sec-butoxide.

4. The process of claim 1 wherein said chromium containing compound is a reaction product of chromium trioxide with triethylphosphate.

5. The process of claim 1 wherein said reducing agent is a non-metallic reducing agent.

6. The process of claim 5 wherein the non-metallic reducing agent is a trialkyl borane.

7. The process of claim 1 wherein the polymerization is carried out in the presence of hydrogen.

8. A process as in claim 6 in which said trialkyl borane is triethyl borane.

9. A process as in claim 6 in which said trialkyl borane is used in such amounts as to provide a B to Cr atomic ratio of from about 0.01:1 to 20:1.

10. A process as in claim 9 in which the B to Cr atomic ratio is about 0.1:1 to 10:1.

* * * * *